W. O. ARZINGER.
PROCESS OF RECOVERING VALUES FROM THEIR ORES.
APPLICATION FILED JUNE 12, 1918.
1,282,730.
Patented Oct. 29, 1918.
5 SHEETS—SHEET 4.
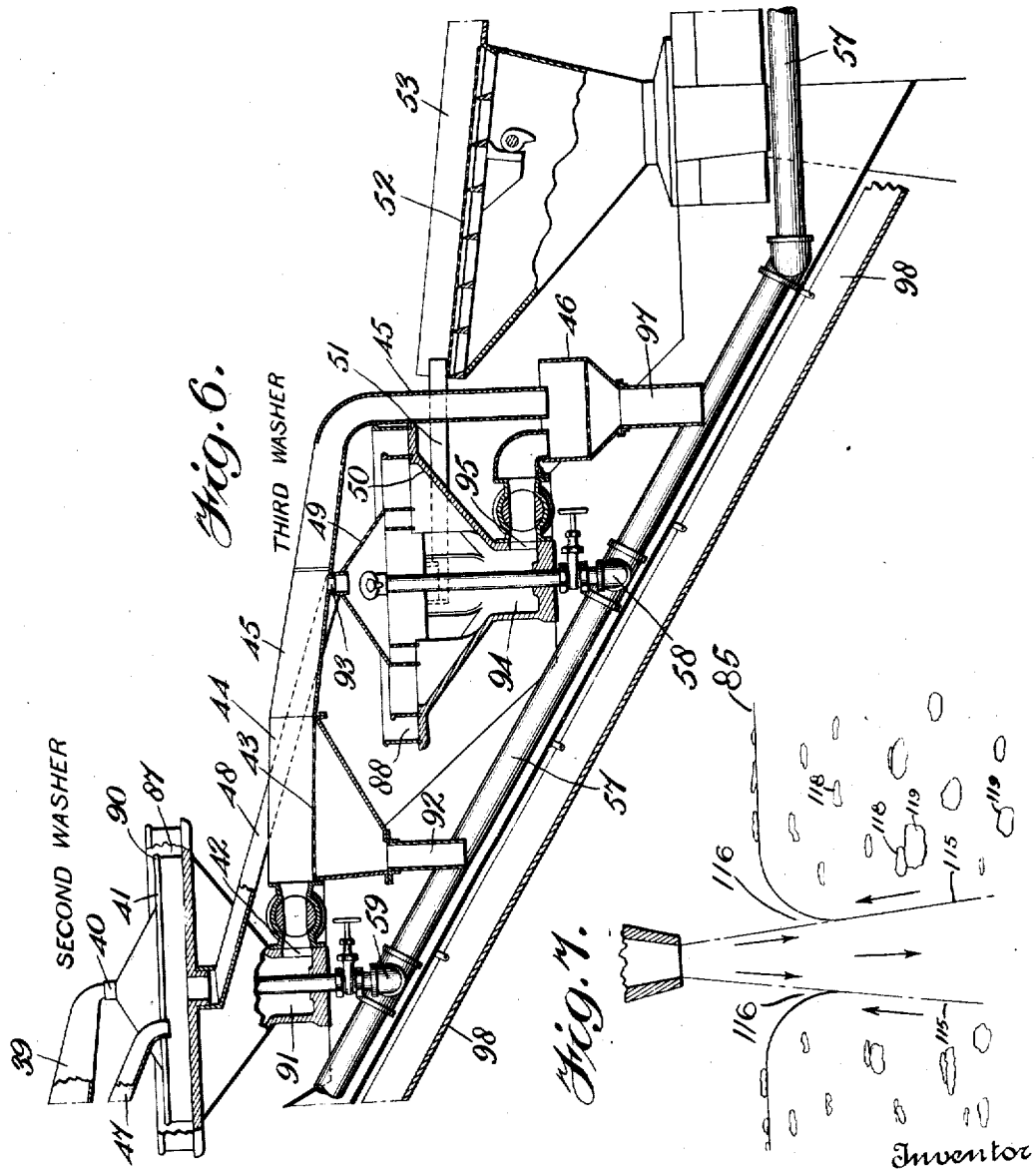
Inventor
William O. Arzinger; by
Attorney

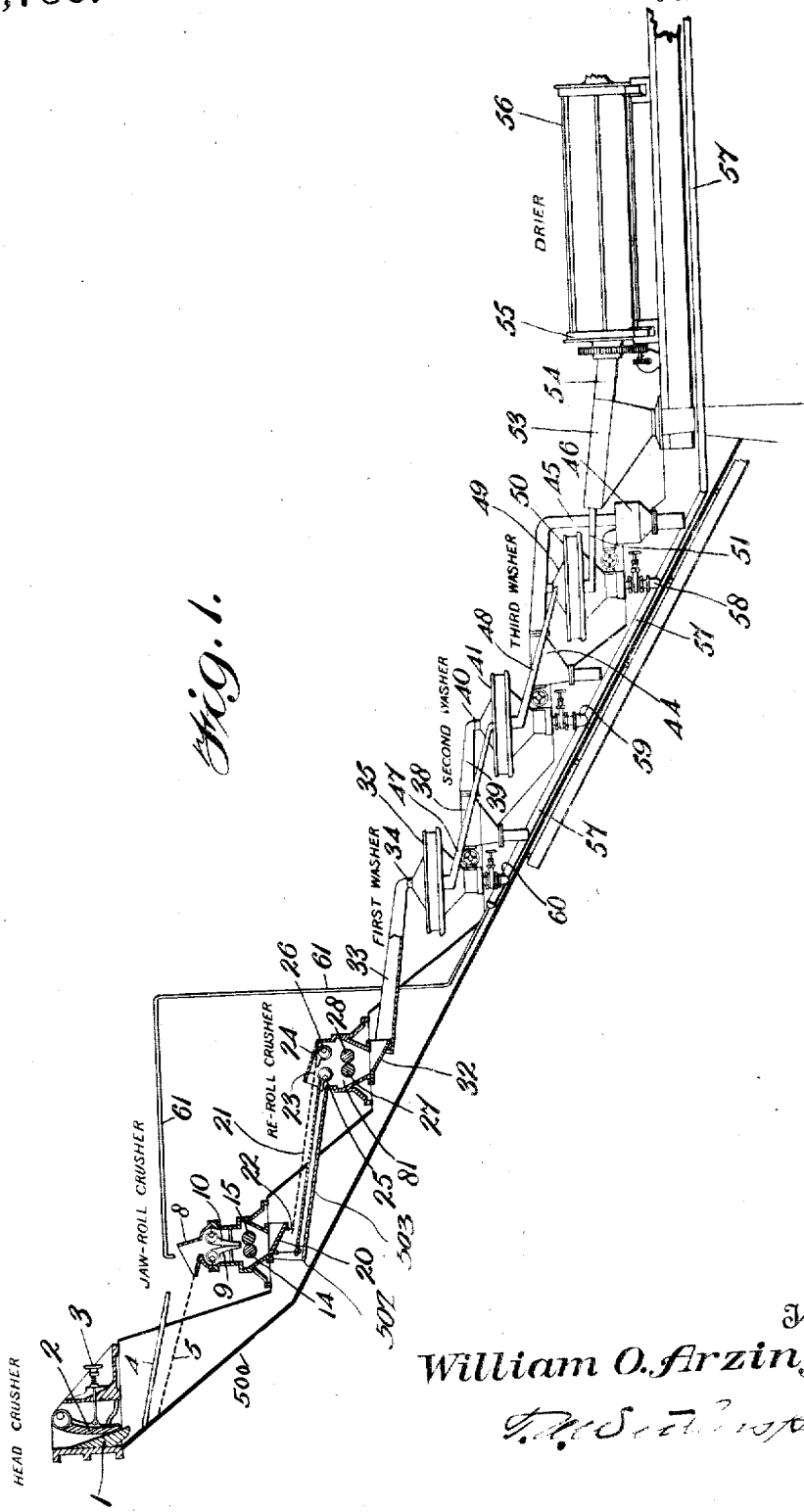

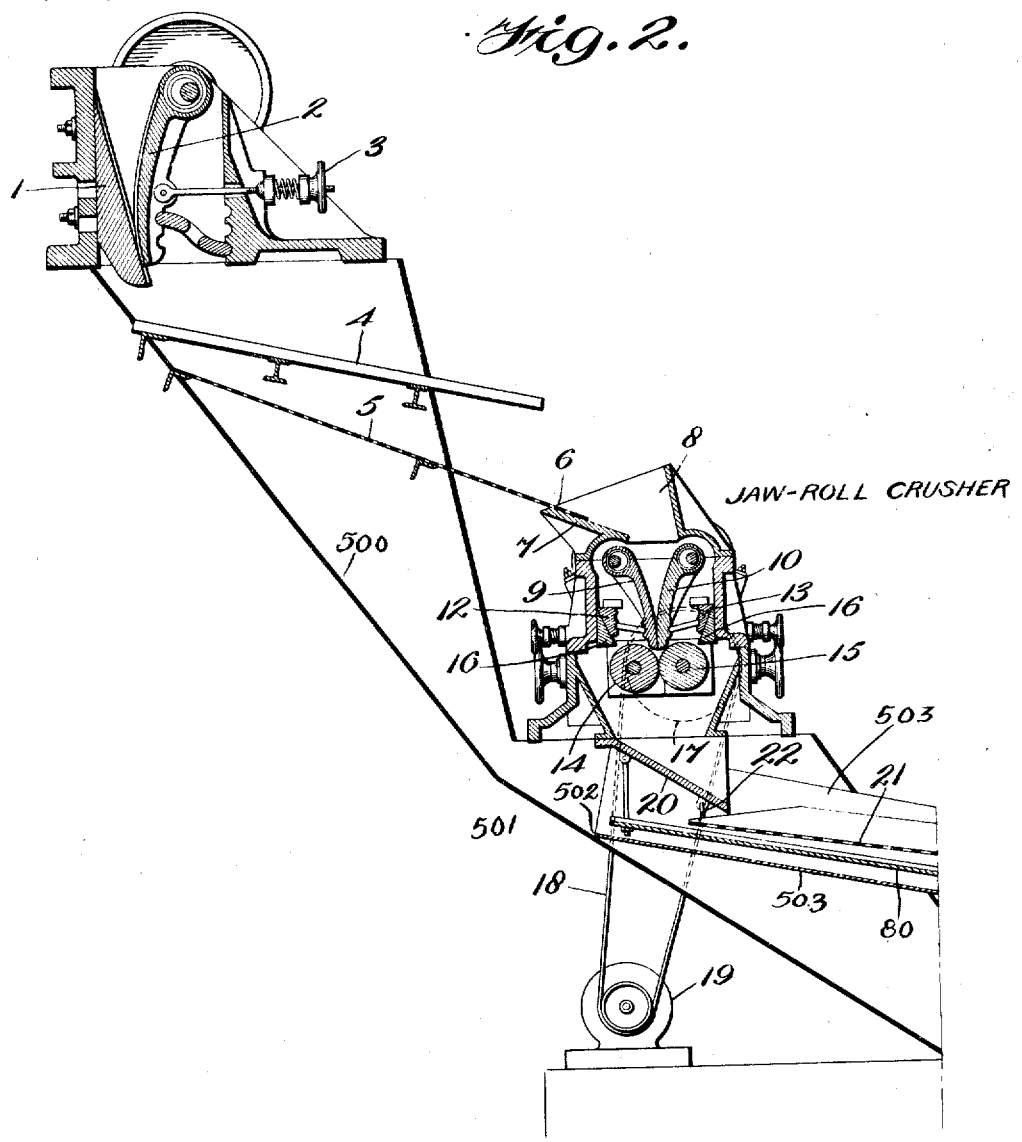

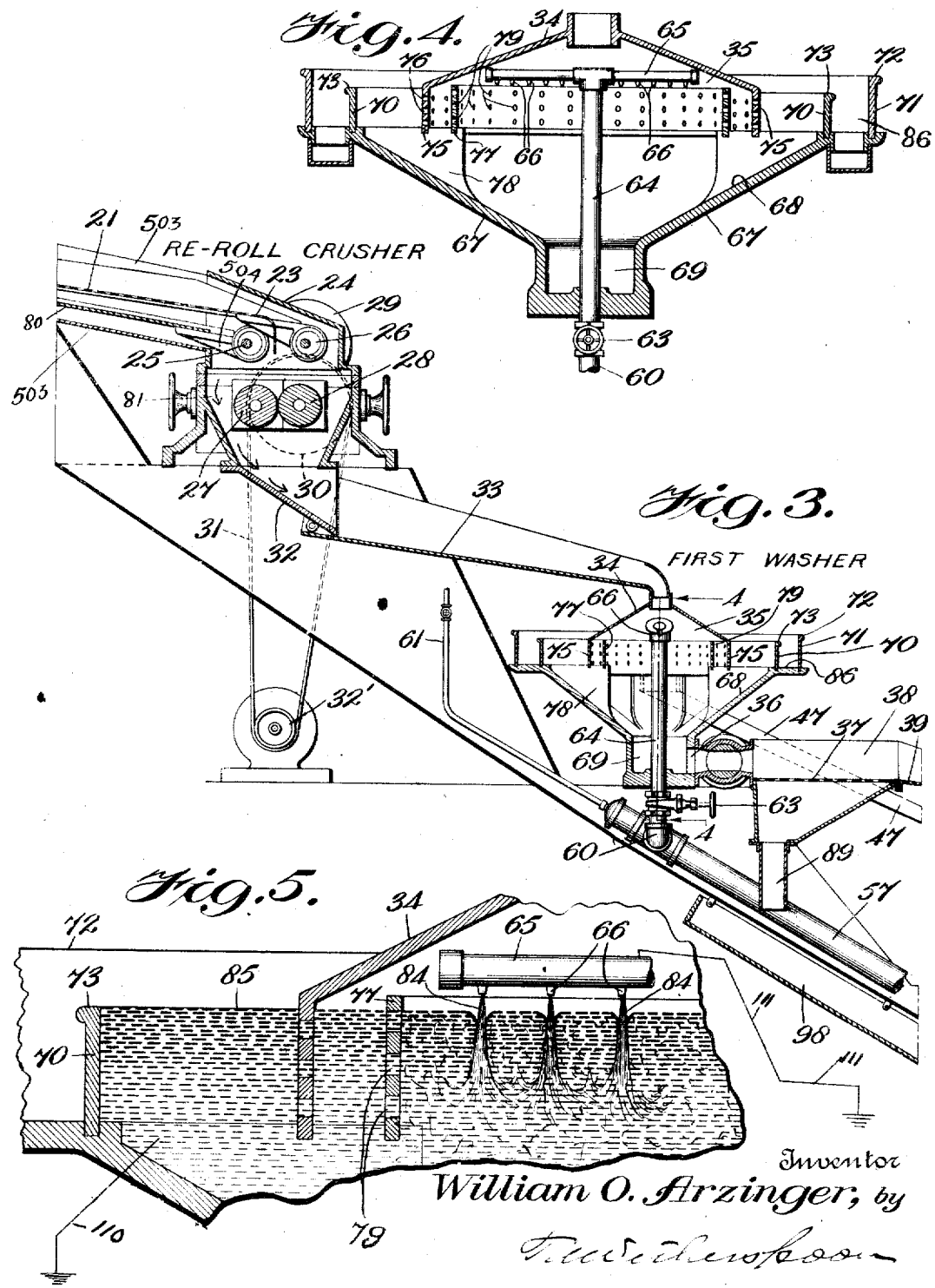

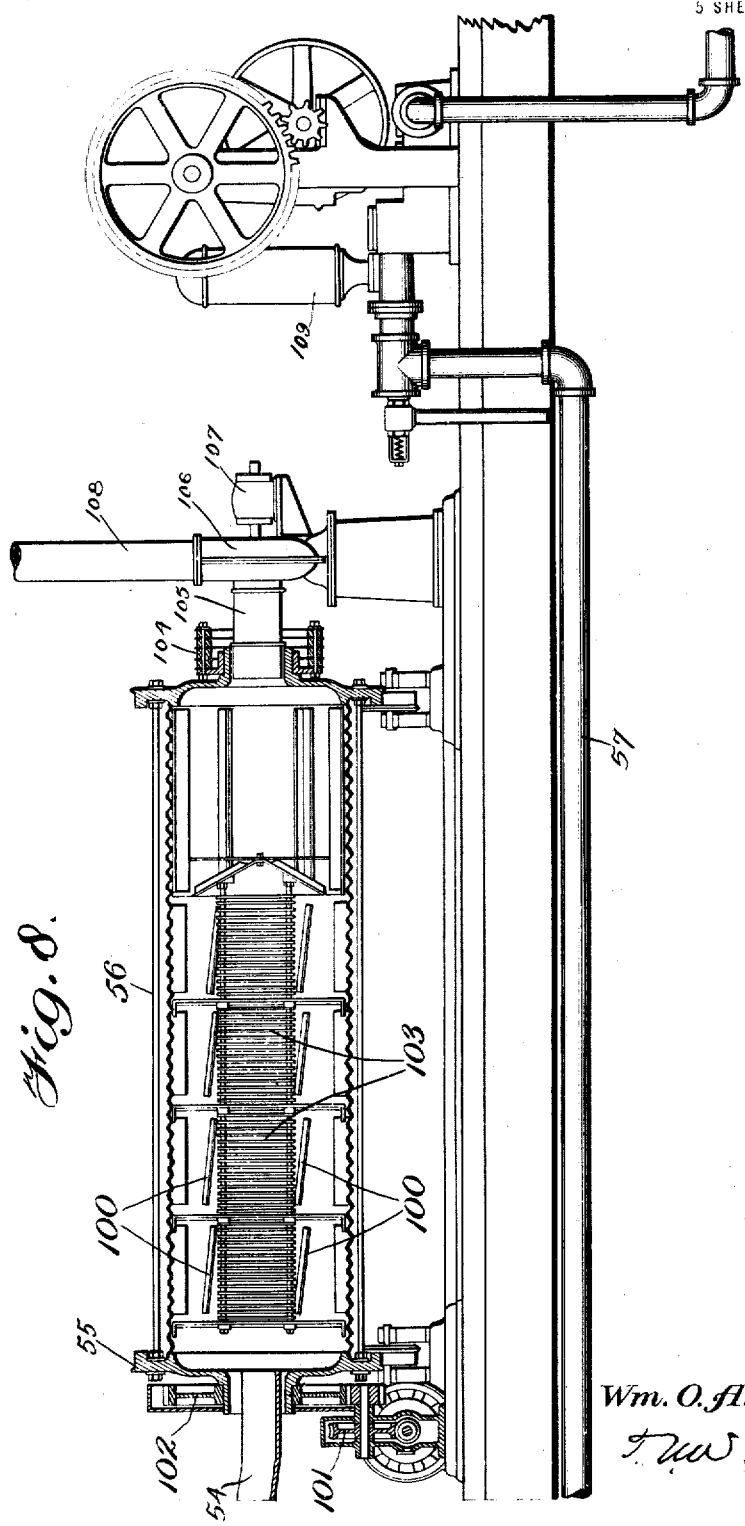

UNITED STATES PATENT OFFICE.

WILLIAM O. ARZINGER, OF NASHVILLE, TENNESSEE.

PROCESS OF RECOVERING VALUES FROM THEIR ORES.

1,282,730. Specification of Letters Patent. Patented Oct. 29, 1918.

Continuation in part of application Serial No. 199,711, filed November 1, 1917. This application filed June 12, 1918. Serial No. 239,560.

*To all whom it may concern:*

Be it known that I, WILLIAM O. ARZINGER, a citizen of the United States, residing at Nashville, in the county of Davidson and State of Tennessee, have invented certain new and useful Improvements in Processes of Recovering Values from Their Ores; and I do hereby declare the following to be a full, clear, and exact description of the invention, such as will enable others skilled in the art to which it appertains to make and use the same.

This invention relates to a process for recovering values from their ores, and has for one of its objects to provide a method certain in operation, and more efficient in action than those which have been heretofore proposed.

With this and other objects in view the invention consists in the novel steps and combinations of step constituting the process, all as will be more fully hereinafter disclosed and particularly pointed out in the claims.

This application is a continuation in part of my copending application #199,711, filed Nov. 1, 1917, and entitled Selective film apparatus.

Referring to the accompanying drawings forming a part of this specification, in which like numerals designate like parts in all the views:—

Figure 1 is a diagrammatic partly sectional view in elevation of an apparatus built in accordance with this invention;

Fig. 2 is an enlarged elevational detail sectional view of a portion of the parts shown in Fig. 1;

Fig. 3 is an enlarged elevational detail sectional view of another portion of the apparatus shown in Fig. 1, including the first washer;

Fig. 4 is an enlarged detail sectional view of one of the washers, or separators, taken on the line 4—4 of Fig. 3;

Fig. 5 is an enlarged detail diagrammatic sectional view of a portion of the parts shown in Fig. 4, and serving to illustrate the action of the washers;

Fig. 6 is an enlarged elevational detail sectional view of that portion of the apparatus which is located immediately below the portions illustrated in Figs. 2 and 3, and including the second and third washers;

Fig. 7 is a diagrammatic view illustrating with greater particularity than does Fig. 5 the operation of this invention; and Fig. 8 is an elevational enlarged sectional view of the drying and recovering end of the apparatus.

Referring more particularly to Fig. 1, the apparatus here illustrated as one embodiment of this invention comprises a head crusher having a pair of crusher jaws 1 and 2, provided with the holding means 3, which jaws deliver on to the rough grizzly or screener 4. Located underneath the grizzly 4 is the inclined screen 5, the lower end 6 of which rests upon one of the walls 7 of the hopper 8 with which the jaw roll crusher having the crusher jaws 9 and 10 is provided, as best shown in Fig. 2.

Said crusher jaws 9 and 10 are adjustably associated with each other by means of the inclined adjustable blocks 12 and 13, and below said jaws 9 and 10 are the crusher rollers 14 and 15 as shown. 16 represents wedge bearing plates for the members 12 and 13, and 17 represents a pulley over which passes the belt 18 leading to a motor or other source of power 19; 20 represents an inclined casting to which the rollers 14 and 15 deliver and 21 a grizzly shaker screen supported at one end 22 from the casting 20, and at its other end 23 terminating in the grizzly hopper 24, with which the re-roll crusher is provided, as shown. The grizzly 21 is operated by the eccentric 26, located in said hopper 24, and beneath which is located the crusher rolls 27 and 28. Located beneath the grizzly 21 is the shaker pan 80 operated by the eccentric 25. Said eccentrics 25 and 26 may be driven by any suitable connections, (not shown) to the shaft able connections, or by any other suitable means. or pulley 30, or by any other suitable means. 29 represents a fly wheel, and 30 a pulley over which passes the belt 31 leading to a motor or other source of power 32'. The rolls 27 and 28 deliver on to the casting 32 of the re-roll crusher, and said casting in turn delivers into the connecting trough 33 leading to the dome 34 of the first washer 35.

36 represents a liquid and gangue outlet from said washer 35 which leads to the screen 37 of the tailing dewaterer 38. From said dewaterer 38 leads the trough or connection 39 to the dome 40 of a second washer 41. In like manner the washer 41 is provided with a liquid and gangue outlet 42 leading to the screen 43 of the dewaterer 44, provided with a discharge connection 45 leading to the tailing discharge trough 46, as best shown in Figs. 1 and 6.

In addition to the connections just disclosed, the first washer 35 is provided with a concentrates connection or trough 47 leading to the washer 41, while the washer 41 is provided with a similar concentrates connection or trough 48 leading to the dome 49 of the washer 50, as best illustrated in Figs. 1 and 6. From the washer 50 a concentrates connection or trough 51 leads to the screen 52 of the concentrates dewaterer 53 as shown. Said concentrates dewaterer 53 is in one piece with the connection 54 leading to the head 55 of the drier 56. 57 represents a water supply pipe provided with the connection 58 leading to the third washer 50, with a connection 59 leading to the second washer 41, and with a connection 60 leading to the first washer 35. Said pipe may also be provided with an extension 61 leading to the hopper 8 of the jaw roll crusher, as shown.

Referring more particularly to Fig. 3, the water connection 60 is provided with a valve 63 and with a vertically disposed washer pipe 64 having a cross arm 65 provided with a plurality of nozzles 66 as best shown in Figs. 3 and 4. Further, the washer 35, which is similar in construction to the other washers, is provided with a main body portion 67 having inclined walls 68 to form the space or sand trap 69, and it is further provided with the inner partition or overflow weir 70, and the outer washer wall 71 whose rim 72 extends above the rim 73 of the weir 70 as shown.

The dome 34 of the washer 35 is provided with the depending flange 75 having the perforations 76, and inside said flange 75 is located an inner perforated member or plate 77, which may be of a ring like or other form. Said members 75 and 77 are conveniently supported from an integral portion 78 of the main body portion 67 of the washer, and the perforations 79 of the inner member plate or partition 77, are preferably made larger than are the perforations 76 of the flange or screen member 75.

The operation of the construction so far as now described is as follows:—

Graphite, or other ore, is conveniently introduced into the head crusher between the jaws 1 and 2, and after being subdivided, the larger pieces are carried by the rough grizzly 4 down into the hopper 8, of the jaw roll crusher where after passing the jaws 9 and 10, it is further crushed by the rolls 14 and 15 whereupon the finely divided material thus produced is received upon the grizzly shaker screen 21.

The finer particles from the head crusher passing through the rough grizzly 4 are caught on the screen 5 whereupon the coarser portions are led into the hopper 8, and the finer particles pass through said screen and are caught on the inclined surface 500 of the foundation trough 501, which leads said particles to the end 502 of the metal trough 503 which underlies the shaker pan 80. Said last named finer particles are then caught by the trough 503 and carried by gravity to and through the passages 504 and 81 of the re-roll crusher, and into the casting 32 as indicated by the arrows in Fig. 3. In the meantime, the fines of those portions of the crushed material which reached the shaker screen 21 pass through said screen onto the shaker pan 80 and are carried by said pan through said passages 504 and 81 to said casting 32, while the coarser portions are carried by said screen into the hopper 24 of the re-roll crusher, where the rollers 27 and 28 still further reduce the material and deliver it on to the casting 32 and into the chute or connection 33.

The finely divided material is now led by the trough or connection 33 into the dome 34 of the first washer 35. The finely divided ore passes into said washer 35 where it meets a plurality of fluid jets 84, issuing from the nozzles 66, see Fig. 5, and is received by the water 85 in said washer. That is to say, said particles are caught by said jets 84 and forced down through the surface 85 of the water and brought into the most intimate contact with the minute bubbles contained in said water in a manner that will presently appear.

The values are separated from the gangue also in a manner to be more fully discussed below after which they are floated up inside the perforated plate 77, through the perforations 79, 76, and off over the rim 73 of the weir or partition 70 into the concentrates trough 86, and through the connection 47 of said first washer into the corresponding trough 87 of the second washer 41, where they are added to the values from said second washer. The values from the first and second washer being thus collected into the trough 87, they are carried off through the connection 48 leading from said trough 87, into the dome 49 of the third washer 50. From said third washer after being rewashed and carried over the weir of said washer into the concentrates trough 88 of the same, said values are carried through trough 51 to the screen 52 of the dewaterer 53.

In the meantime, the gangue which has been separated from the values in the first washer 35 finds its way down along the inclined bottom 68 into the trap 69, and along with the water in said first washer passes through the passage 36 onto the screen 37 of the dewaterer 38. Any finely divided portion of the gangue which will pass said screen 37 travels with the water through said screen into the discharge pipe 89. The coarser portions of the gangue which will be associated with more or less of the values will pass over said screen 37 into the connection 39, and from said connection into the dome of the second washer 41.

Here the values will be again separated from the gangue in the manner above disclosed, whereupon said values will flow over the rim of the inner partition or weir 90 of said second washer and into the concentrates trough 87 as above stated. The gangue in said second washer will pass down into the trap 91 corresponding to the trap 69, and will pass through the opening 42 on to the screen 43 of the dewaterer 44, whereupon the finer particles denuded of their values will pass through said screen and out through the discharge pipe 92. The coarser particles consisting of the remaining values and gangue will pass over said screen 43 along the connection 45 and if it be desired to rewash the tailings, then through the opening 93 into the dome 49 of the third washer 50.

If it be not desired to rewash said tailings then the opening 93 of said third washer may be closed by a valve, not shown, whereupon said tailings will pass on through the connection 45 into the dewaterer 46 as will be readily understood.

The values thus passed into the third washer 49 will be likewise separated from their gangue, the latter will find itself caught in the trap 94, and will pass out the connection 95 into the tailings dewaterer 46, all as will be clear from Fig. 6. The dewaterer discharge pipe 97 as well as the discharge pipes 92 and 89 conveniently empty into the trough, or container 98 as shown, whence the water may be carried to any desired place, as for example, a reservoir, not shown, and used over and over again. The concentrates or values being thus completely separated from their gangue, pass by way of the connection 51 on to the screen 52 of the dewaterer 53 whereupon they are deprived of a very large portion of their water, and from said screen they pass into the head 55 of the drying drum 56 which is conveniently composed of a plurality of inclined baffles or plates 100 adapted to stir or agitate the material, while the drum itself is rotated by means of the gears 101 and 102 and their connections.

103 represents heating elements which may be conveniently heated by electricity led in through the connection 104. 105 represents a connection with a suction fan 106 driven by the motor 107, which collects the dried finely divided values and delivers them through the pipe 108 to any desired place. 109 represents a pump to feed the supply pipes 57 and 61.

After the material reaches the screen in the dewaterer 46, the tailings or gangue may be carried off by means not shown, while the fines of said gangue accompanying said tailings pass through the said screen along with the water into the trough 98, where they are, or may be, precipitated in any suitable and well known manner. Likewise the very fines of the gangue which pass through the screen 52 with the water are or may be also precipitated. By thus precipitating out these fines the water may be used over and over again.

In practice I find that as low a quantity of oil as one drop to a gallon of water, or one pint to 12000 gallons of water may be used. I also prefer to use a pressure on my jets 84, exceeding two pounds to one square inch, and have used pressures as high at 150 pounds to 200 pounds to the square inch.

I find that the higher the pressure within limits the greater will be the quantity of air entrained into the body of the liquid and the greater is also the recovery of the mineral values. With these very small quantities of oil and high pressures, the entrainment of the air under the surface of the liquid is of a white milk like appearance, and it produces a mass of very fine air filled vesicles that is very bouyant and brittle, and wholly unlike the froth of the prior processes. The entrainment of the air in the manner above disclosed is also accompanied by presistent static electrical effects which are modified by electrically grounding the liquid, or the apparatus, as indicated at 110, Fig. 5, and if the jet supply 65 is not already electrically grounded, I may also ground the same as indicated at 111.

By operating an apparatus of the above construction in the manner described, I have demonstrated from a number of full sized commercial mills that I can take graphite ore for example, and separate out as high as 96% of the graphite present. I have also commercially demonstrated that the recovered concentrates will run from 80% to 88% pure graphite and at a cost not exceeding 1½ cents per pound.

After the ore has entered the head crusher, it only requires 10 seconds for the values to be thus recovered in the first washer. The dust is kept down by sprinkling the ore with water while being crushed as by the pipe 61, or other suitable means.

I am unable to scientifically and satisfactorily explain these most remarkable results, but without committing myself to any particular theory, I believe the following to be a plausible explanation:—

It is well known that water in the form of jets as above disclosed will entrain very surprising quantities of air which thoroughly permeate the liquid. In fact, I find that in my machines so great is this permeation that the entire volume of liquid and entrained air may sometimes be say one third larger than the original volume of the liquid without the air. It is further observed in my process that this entrained air exists in such a fine state of subdivision and it permeates the contaminated water so thoroughly that it imparts a milk white appearance to the water which is very different from that imparted by the froth of the prior processes. I call this body of water emulsified with oil, or other contaminant and containing this entrained air, an opaque mixture of water, oil and air.

Further, it is an observed fact that the friction of the said jets 84, (see Fig. 7,) against the surfaces such as 115 of the main body of water generates considerable quantities of electricity which charge the entrained air with electricity of the same sign, and thus cause the minute air vesicles in the mixture to act repulsively toward each other, or at least it prevents them from coalescing into the larger bubbles of the prior processes. This electrical charging action is undoubtedly promoted by the very minute traces of oil which must separate the air vesicles and which must cause a sort of condenser action over the enormous total surface which said vesicles possess, and therefore, the quantity of electricity that may be absorbed by this milk white mixture in the water is very great. In fact, I have myself received shocks from my machines while operating.

I have further observed that greater quantities of electricity seem to be generated in cold weather than in warm weather, and also when the humidity of the air has been increased. Whenever the electrical effects are increased, I have observed that the recovery of the values is better, and the same effect is had by electrically grounding the main body of the liquid.

It is a further observed fact that the greater the quantity of static electricity produced the greater is the buoyant effect on the emulsified particles. In addition to the above, my process differs essentially from the prior processes in that the physical force of the downward pressure of the jets 84 serves to mechanically separate the ore values 118 from the gangue 119, and the reacting upwardly flowing currents of liquid serve to mechanically force or buoy up the air filled vesicles in masses, which collectively force the values particles 118 to the surface 85 in a manner quite different from that of the prior processes.

If it be true that the oil present emulsified in the liquid absorbs the values to at least a theoretical extent, yet, said oil is in such an excessively minute quantity that it cannot mechanically exert any measurable force, for a simple calculation will show that the total surface of the value particles is so enormous that only an infinitesimal theoretical trace of oil could adhere to each particular particle.

In fact, my process I believe more depends upon the upward pushing, or buoying action of the masses of vesicles in the mixture of oil, air and water, than on any adsorption action of true air bubbles that seems so prominent in the prior processes. The longer my liquid is used within limits, the better emulsified the oil becomes with the water, and the more efficient is the recovery of the values. This increased emulsification of the oil is promoted by the agitation produced by the pump 108, which feeds the water supply pipe 57 and its connections.

It will be observed that my jets 84 are free from ore; that their discharge orifices are, compared to processes that have been heretofore proposed, relatively very close to the surface of the liquid, and to the ore in the liquid; that they are relatively much smaller in cross section than other jets; and that therefore, they can be operated at a relatively very high velocity so that their abrading action on the ore becomes an important factor, in that they tend to separate the values from the ore, while at the same time, they vigorously entrain air in very finely divided quantities into the liquid. All of these advantages combine to produce my efficient buoyant mass of air filled vesicles, carried by counter currents which serve to effectually float or decant off the values of the ore beyond the rim 73 of the container 70. The efficiency of this separating action is further aided by the retarding action exerted on said buoyant mass by the perforated members 75 and 77. These members not only retard said counter currents, but they effectually break up the persistent vesicles while permitting the ore values to pass into the more quiet liquid beyond.

While my mixed air, oil and water acts to thus efficiently and quickly carry the values to the top surface 85 the water itself acts in the manner of the prior processes to carry the gangue downward. It will thus be seen that my process differs from those that have gone before in that—

(a) By entraining air into the main body of the contaminated liquid by means of the jets 84 I am enabled to produce a buoyant milk white mixture of oil and water which is statically charged and which acts to bring the values quickly and efficiently to the surface;

(b) That I am enabled to use this same water over and over again without adding any more of the contaminant.

(c) That I produce a very brittle and quickly acting mass of air laden vesicles, the larger of which readily break up after reaching the surface 85, so that a comparatively small machine can do the work of a much larger machine operating under the old processes;

(d) That the more oil or other contaminant I employ with graphite ore, the thicker becomes the mass of vesicles of my opaque mixture and the more gangue or slime do I lift, and thus the less efficient becomes my process;

(e) It follows that my process involving static charges of electricity, contrary to the prior practice, becomes more efficient with an extremely small percentage of oil than with larger quantities such as those which have been heretofore employed. The actual quantity of oil that I employ of course depends somewhat upon the nature of the values being recovered. But, in all cases, owing to the action of the jets, to the extraordinarily large quantity of air entrained into the liquid, and owing to the action of the static charges generated, I can use less quantities of contaminants than any of the prior processes, now in use, and I can further use contaminants on a given ore that would be unsuccessful in these said prior processes.

(f) It will thus be seen that my process further differs from other processes in that I employ only a single body of contaminated, air impregnated liquid, a portion of which passes through the nozzles 66 to form the jets 84. That these jets 84 continuously entrain air into the liquid to form buoyant mist like masses of minute, air filled vesicles, or spume, as well as reacting currents which agitate said liquid and carry upwardly said buoyant masses. That said currents and masses continuously float or decant off the values over the weir 70 into the trough 86 and out of the system, while another portion of the main body of liquid 85 further continuously carries the tailings through the passage 95, and thus prevents the apparatus from clogging.

It will be observed that the surfaces of the pools of liquid 85 held by the washers are free to flow over the edges 73 of the weirs 70, and therefore, that they are substantially unconfined. It will also be observed that the portions of said pools located inside the perforated partitions 75 and 77 constitute regions of agitation where the gangue is separated from the values, while those portions of said pools outside of said partitions constitute relatively quiescent regions where the separated values are floated off and carried away. It therefore results that the fluid jets 84 are delivered to extended horizontally disposed and substantially unconfined surfaces of a liquid containing the material to be separated, in agitating, or separating regions; that said jets not only act to mechanically abrade and separate the values from the gangue of said material, as well as to produce buoyant masses of air filled vesicles, but they also cause countercurrents in said liquid which carry the values on said buoyant masses from the agitating or separating regions into the flotation or quiescent regions outside of said partitions 75 and 77, whence the said unconfined, flotation surfaces, carry said values out of said washers.

Whereas in the foregoing disclosure, I have referred to water, air, oil and graphite, it is to be distinctly understood that my process is by no means limited to any particular gas, any particular liquid, or to any particular contaminant or chemical. In some cases, in fact, I can omit the contaminant altogether.

It is also to be distinctly understood that this process is applicable to ores in general, and especially to the separation of ore components from other ore components having different characteristics.

It is obvious that those skilled in the art may vary the details of my procedure as well as the steps of the process without departing from the spirit of the invention, and therefore, I do not wish to be limited to the above disclosure except as may be required by the claims.

What I claim is:—

1. The process of separating an ore value from its associated gangue, which consists in causing a fluid jet free from ore to impinge upon a substantially unconfined surface of a values decanting body of liquid in the presence of a gas to entrain said gas in said liquid while feeding the said value and gangue in a disintegrated condition to said liquid; and collecting the values thereby floated substantially as described.

2. The process of separating an ore value from its associated gangue which consists in causing a fluid jet free from ore to impinge upon a substantially unconfined surface of a values decanting body of contaminated liquid in the presence of air to entrain in and mix said air in an electrically charged condition with said liquid while feeding said value and gangue to said liquid; and collecting the values thereby floated substantially as described.

3. The process of separating an ore value from its associated gangue which consists in causing a fluid jet to impinge upon the surface of an electrically grounded liquid in the presence of a gas to entrain said gas in said liquid while feeding the said value and gangue in a disintegrated condition to said liquid; and collecting the values thereby floated substantially as described.

4. The process of separating an ore value from its associated gangue which consists in causing a fluid jet to impinge upon the surface of a contaminated liquid connected for discharging frictionally generated charges in the presence of air to entrain in and mix said air with said liquid while feeding said value and gangue to and through the surface of said liquid; and collecting the values thereby floated, substantially as described.

5. The process of separating an ore value from its associated gangue which consists in causing a fluid jet free from ore to impinge upon the surface of a values decanting body of liquid in the presence of air and producing in said liquid a buoyant mass of air filled vesicles capable of buoying up ore values to the surface, while independently feeding said values and gangue to said liquid, substantially as described.

6. The process of separating an ore value from its associated gangue which consists in causing a fluid jet free from ore to impinge upon the surface of a liquid associated with means for discharging static charges of electricity in the presence of air and producing in said liquid a buoyant mass of air filled vesicles capable of buoying up ore values to the surface while feeding said values and gangue in a finely divided condition to said liquid, substantially as described.

7. The process of separating ore values from their associated gangue which consists in causing a fluid jet free from ore to impinge upon the surface of a values decanting body of liquid in the presence of air thereby causing said air to become entrained in said liquid while producing a buoyant mass of air filled vesicles and upwardly flowing currents in said body of liquid; feeding a mixture of finely divided values and gangue to said liquid to cause said values to be carried to the surface by said mass; and floating off said values after said surface has been reached, substantially as described.

8. The process of separating ore values from their associated gangue which consists in causing a fluid jet to impinge upon the surface of an electrified, electrically grounded contaminated liquid in the presence of air thereby causing said air to become entrained in said liquid while producing a buoyant mass of air filled vesicles and upwardly flowing currents in said liquid; feeding a mixture of ore values and gangue to the surface of said liquid to cause said values to be carried to the surface by said mass; floating off said values after said surface has been reached; and suitably drying the recovered values, substantially as described.

9. The process of separating graphite from its gangue which consists in causing a water jet free from ore to impinge upon the surface of a values decanting body of water in the presence of air, thereby entraining said air in said water, forming a buoyant mass of air filled vesicles and agitating said water and mass; feeding said graphite and gangue in a finely divided condition to said agitated water and mass thereby causing said graphite to be carried to said liquid, and said gangue to the bottom thereof; and floating off and drying said graphite, substantially as described.

10. The process of separating graphite from its gangue which consists in causing a plurality of electrically grounded water jets to impinge upon the surface of a contaminated body of electrically grounded water in the presence of air, thereby statically charging and entraining said air in said water, forming a buoyant mass of air filled vesicles and agitating said water and mass; feeding by gravity said graphite and gangue in a finely divided condition to said agitated water and mass, thereby causing said graphite to be carried to the surface of said liquid and said gangue to the bottom thereof; subjecting said gangue to the action of additional liquid jets to separate out the values present; and floating off and drying said graphite, substantially as described.

11. The process of separating values from their associated gangue, which consists in repeatedly subjecting the mixed values and gangue in a values decanting body of liquid to the mechanical action of water jets free from ore, and to the action of upwardly moving currents of water having buoyant masses of air filled vesicles capable of carrying said values to the surface of said water; and suitably recovering said values, substantially as described.

12. The process of separating graphite values from their associated gangue, which consists in repeatedly subjecting the mixed values and gangue to the mechanical action of electrically grounded water jets free from ore and to the action of electrically grounded upwardly moving currents of oil contaminated water having buoyant masses of air filled vesicles capable of carrying said values to the surface of said water; and suitably recovering said values, substantially as described.

13. The process of separating a value from its ore which consists in providing a pool of liquid containing said ore, said pool provided with a separating region, a value flotation region, and a substantially unconfined moving surface common to both; and causing a fluid jet free from ore to impinge upon said surface in said separating region to entrain air therein and distribute the same throughout said pool, while producing counter currents and mechanically abrading said ore; whereby said values are separated from their gangue and carried by said counter currents from said separating region to said flotation region and unconfined moving surfaces, substantially as described.

14. The process of separating a value from its ore which consists in providing a pool of liquid; separating off a portion of said pool to form an agitating region and a relatively quiescent region having a common substantially unconfined surface; causing ore to be fed to the agitating region of said pool; causing a fluid jet free from ore to impinge upon said liquid in its agitating region to produce counter currents therein and to abrade said ore, while entraining air into said liquid and forming a mass of buoyant vesicles throughout the pool, whereby said currents and mass float off said value from said agitating region to said quiescent region; and recovering said value from said last named region, substantially as described.

15. The process of separating a value from its ore which consists in providing a pool of liquid; feeding ore to said pool; and causing a fluid jet free from ore to pass through a short atmospheric path, to impinge upon the surface of said pool in close proximity to the ore therein, and to contact with said ore, whereby counter currents carrying a buoyant mass of air filled vesicles are produced throughout said pool, which are adapted to float the values of said ore on said pool, substantially as described.

16. The process of separating a value from its ore which consists in providing a pool of liquid having an agitating and a floating region; feeding ore to said pool; and causing a fluid jet without substantial vertical deflection and free from ore to pass through a short atmospheric path, and to impinge upon the surface of said pool and upon the ore therein; whereby the values of said ore are partially separated from their gangue by the mechanical action of said jet, and a buoyant mass of air filled vesicles are produced which are adapted to float the values of said ore over the rim of said pool, substantially as described.

17. The process of separating a value from its ore which consists in providing a pool of liquid having an agitating and a floating region; feeding ore pulp to said pool; causing a fluid jet free from ore to pass through a short atmospheric path and to impinge upon the surface of said pool as well as upon the ore therein to form counter currents and a buoyant mass of air filled vesicles adapted to float off the ore values; and retarding the outward flow of said currents and mass, substantially as described.

18. The process of separating a value from its ore which consists in providing a pool of liquid having an agitating and a floating region; feeding ore to said pool; causing a fluid jet free from ore and without substantial vertical deflection to pass through a short atmospheric path and to impinge upon said pool and ore therein, whereby counter currents and a buoyant mass of air filled vesicles are formed in said pool; and retarding the outward flow of said currents and mass, substantially as described.

19. The process of separating an ore value from its associated gangue which consists in causing a fluid jet free from ore and without substantial vertical deflection to impinge upon the surface of a contaminated liquid containing ore and connected for discharging frictionally generated charges whereby counter currents and a buoyant mass of air filled vesicles are produced; and retarding the outward flow of said currents and mass, substantially as described.

20. The method of separating values from gangue which consists in depositing in a body of liquid having a substantially horizontally unconfined surface, a value containing ore; projecting through an atmosphere of gas onto, and into, said body of liquid a jet of fluid free from ore, thereby causing the values to rise with gas filled vesicles to the surface of said body of liquid; and permitting the gangue to settle, substantially as described.

I testimony whereof I affix my signature.
WILLIAM O. ARZINGER.

It is hereby certified that in Letters Patent No. 1,282,730, granted October 29, 1918, upon the application of William O. Arzinger, of Nashville, Tennessee, for an improvement in "Processes of Recovering Values from Their Ores," errors appear in the printed specification requiring correction as follows: Page 6, line 52, claim 8, strike out the words "the surface of"; same page, line 67, claim 9, before the words "said liquid" insert the words *the surface of;* and that the said Letters Patent should be read with these corrections therein that the same may conform to the record of the case in the Patent Office.

Signed and sealed this 11th day of March, A. D., 1919.

[SEAL.]

R. F. WHITEHEAD,

*Acting Commissioner of Patents.*

Cl. 83—85.